United States Patent
Sarkis et al.

(10) Patent No.: US 10,849,117 B2
(45) Date of Patent: Nov. 24, 2020

(54) TECHNIQUES AND APPARATUSES FOR CONTROL INFORMATION DETERMINATION FOR PAYLOADS WITH LEADING ZEROES

(71) Applicant: QUALCOMM Incorporated, San Diego, CA (US)

(72) Inventors: Gabi Sarkis, San Diego, CA (US); Jing Jiang, San Diego, CA (US); Yang Yang, San Diego, CA (US); Peter Gaal, San Diego, CA (US); Joseph Binamira Soriaga, San Diego, CA (US); Wanshi Chen, San Diego, CA (US); Heechoon Lee, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/184,692

(22) Filed: Nov. 8, 2018

(65) Prior Publication Data

US 2019/0150120 A1    May 16, 2019

Related U.S. Application Data

(60) Provisional application No. 62/585,398, filed on Nov. 13, 2017.

(51) Int. Cl.
*H04W 72/04* (2009.01)
*H04L 1/00* (2006.01)

(52) U.S. Cl.
CPC ......... *H04W 72/042* (2013.01); *H04L 1/0057* (2013.01); *H04L 1/0061* (2013.01); *H04L 1/0072* (2013.01)

(58) Field of Classification Search
CPC .... H04L 1/0057; H04L 1/0061; H04L 1/0072
See application file for complete search history.

(56) References Cited

U.S. PATENT DOCUMENTS

| | | | |
|---|---|---|---|
| 2012/0182950 A1* | 7/2012 | Chung | H04L 5/0053 370/329 |
| 2013/0010709 A1* | 1/2013 | Earnshaw | H04L 5/0091 370/329 |
| 2014/0092830 A1* | 4/2014 | Chen | H04W 72/042 370/329 |

(Continued)

FOREIGN PATENT DOCUMENTS

WO    2018212881 A1    11/2018

OTHER PUBLICATIONS

3GPP TSG RAN WG1 Meeting 90bis R1-1717995 Prague, CZ, Oct. 9-13, 2017; "Remaining Issues of Polar Code Construction for UCI and DCI"; Ericsson (Year: 2017).*

(Continued)

*Primary Examiner* — Benjamin H Elliott, IV
(74) *Attorney, Agent, or Firm* — Qualcomm Incorporated

(57) ABSTRACT

Certain aspects of the present disclosure generally relate to wireless communication. In some aspects, a user equipment may receive a communication that includes downlink control information (DCI), wherein a size of the DCI affects a cyclic redundancy check (CRC) value associated with the communication; and determine the DCI or the size of the DCI based at least in part on the CRC value. Numerous other aspects are provided.

30 Claims, 7 Drawing Sheets

(56) References Cited

U.S. PATENT DOCUMENTS

| | | | |
|---|---|---|---|
| 2016/0007374 A1* | 1/2016 | Lee | H04W 72/0446 370/336 |
| 2016/0374141 A1* | 12/2016 | He | H04B 7/0686 |
| 2017/0019890 A1* | 1/2017 | Chung | H04L 1/0072 |
| 2018/0124815 A1* | 5/2018 | Papasakellariou | H04W 72/1268 |
| 2018/0324764 A1* | 11/2018 | Bendlin | H04W 72/042 |
| 2019/0052487 A1* | 2/2019 | Shelby | H04L 1/1887 |
| 2019/0149173 A1* | 5/2019 | Chen | H03M 13/13 714/758 |
| 2019/0150120 A1* | 5/2019 | Sarkis | H04L 1/0057 370/329 |

OTHER PUBLICATIONS

3GPP TSG RAN WG1 Meeting 90bis R1-1718395 Prague, CZ, Oct. 9-13, 2017; "Polar code considerations for search space design"; AT&T (Year: 2017).*

3GPP TSG RAN WG1 #90bis R1-1718407 Aug. 21-25, 2017 Prague, Czech Republic; On setting the values of Frozen bit locations for Polar codes; AT&T (Year: 2017).*

AT&T: "Polar Code Considerations for Search Space Design", 3GPP Draft, R1-1718395 ATT Search Space, 3RD Generation Partnership Project (3GPP), Mobile Competence Centre, 650, Route Des Lucioles, F-06921 Sophia-Antipolis Cedex, France, vol. RAN WG1, No. Prague, CZ, Oct. 9, 2017-Oct. 13, 2017, Oct. 8, 2017 (Oct. 8, 2017), XP051341577, 2 Pages, Retrieved from the Internet: URL:http://www.3gpp.org/ftp/Meetings_3GPP_SYNC/RAN1/Docs/ [retrieved on Oct. 8, 2017].

International Search Report and Written Opinion—PCT/US2018/059970—ISA/EPO—Feb. 27, 2019.

Neul Ltd: "Proposed Text for the TR on Cellular IoT Scheduling", 3GPP Draft, GPC150103 Proposed Text for the TR on Cellular IoT Scheduling_V2, 3RD Generation Partnership Project (3GPP), Mobile Competence Centre, 650, Route Des Lucioles, F-06921 Sophia-Antipolis C, No. Sofia Antipolis, France, Feb. 2, 2015-Feb. 5, 2015, Feb. 4, 2015 (Feb. 4, 2015), XP050931436, pp. 1-6, Retrieved from the Internet: URL:http://www.3gpp.org/ftp/Meetings_3GPP_SYNC/GERAN/Docs/ [retrieved on Feb. 4, 2015].

Qualcomm Incorporated: "DCI CRC Initialization and Masking," 3GPP Draft; R1-1720704-DCI CRC Initialization and Masking, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 27, 2017-Dec. 1, 2017, Nov. 19, 2017, XP051370165, 5 pages, Retrieved from the Internet: URL: http://www.3gpp.org/tsg_ran/WG1_RL1/TSGR1_91/Docs/ [retrieved on Nov. 18, 2017].

* cited by examiner

TECHNIQUES AND APPARATUSES FOR CONTROL INFORMATION DETERMINATION FOR PAYLOADS WITH LEADING ZEROES

CROSS-REFERENCE TO RELATED APPLICATIONS UNDER 35 U.S.C. § 119

This application claims priority to Provisional Patent Application No. 62/585,398, filed on Nov. 13, 2017, entitled "TECHNIQUES AND APPARATUSES FOR CONTROL INFORMATION DETERMINATION FOR PAYLOADS WITH LEADING ZEROES," which is hereby expressly incorporated by reference herein.

FIELD OF THE DISCLOSURE

Aspects of the present disclosure generally relate to wireless communication, and more particularly to techniques and apparatuses for control information determination for payloads with leading zeroes.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication performed by a user equipment (UE) may include receiving a communication that includes downlink control information (DCI), wherein a size of the DCI affects a cyclic redundancy check (CRC) value associated with the communication; and determining the DCI or the size of the DCI based at least in part on the CRC value.

In some aspects, a UE for wireless communication may include memory and one or more processors operatively coupled to the memory. The memory and the one or more processors may be configured to receive a communication that includes DCI, wherein a size of the DCI affects a CRC value associated with the communication; and determine the DCI or the size of the DCI based at least in part on the CRC value.

In some aspects, a non-transitory computer-readable medium may store one or more instructions for wireless communication. The one or more instructions, when executed by one or more processors of a UE, may cause the one or more processors to receive a communication that includes DCI, wherein a size of the DCI affects a CRC value associated with the communication; and determine the DCI or the size of the DCI based at least in part on the CRC value.

In some aspects, an apparatus for wireless communication may include means for receiving a communication that includes DCI, wherein a size of the DCI affects a CRC value associated with the communication; and means for determining the DCI or the size of the DCI based at least in part on the CRC value.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
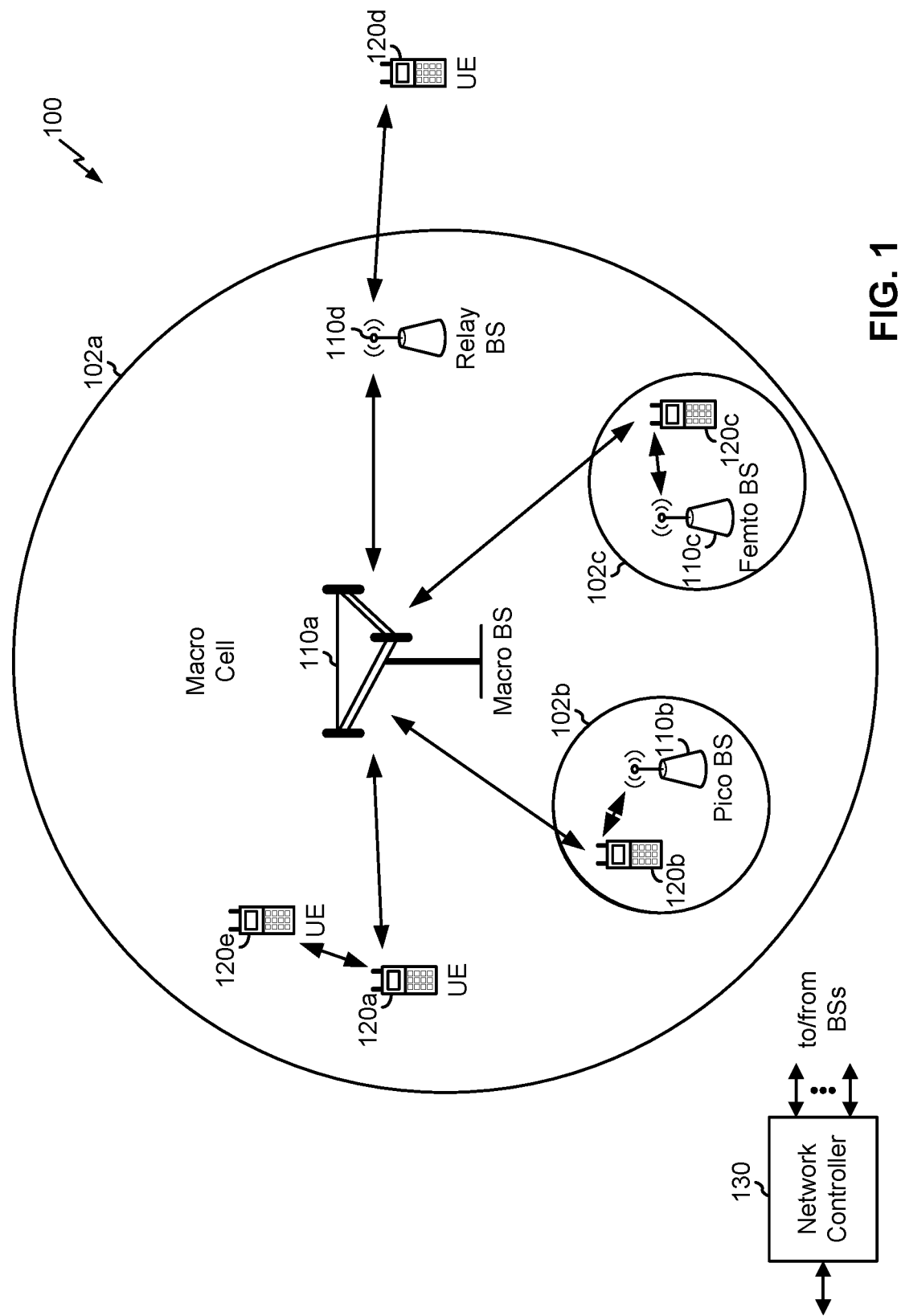
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
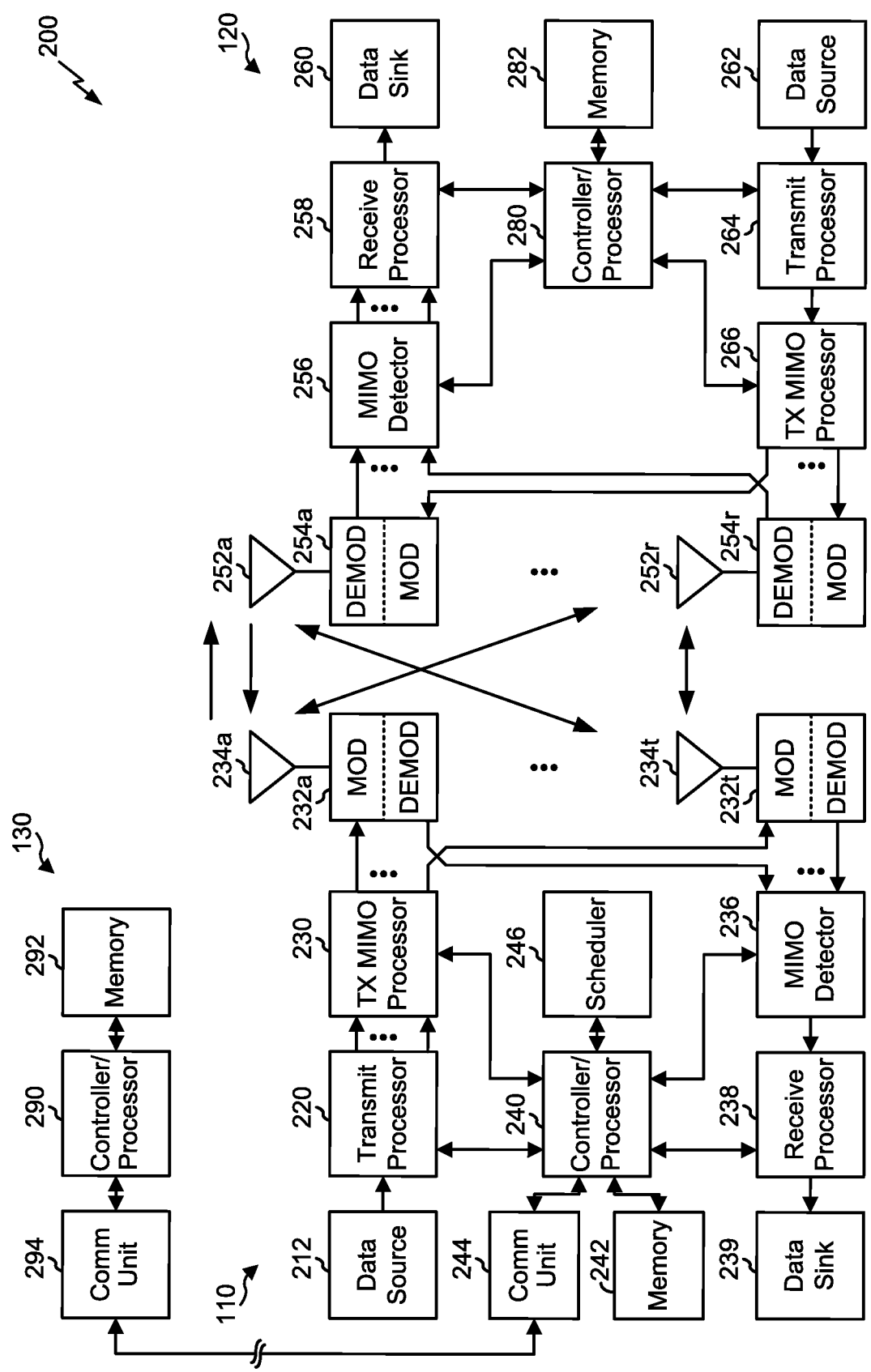
FIG. 2 is a block diagram conceptually illustrating an example of a base station in communication with a user equipment (UE) in a wireless communication network, in accordance with various aspects of the present disclosure.

FIG. 2 shows a block diagram of a design 200 of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280.

Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with control information determination for payloads with leading zeroes, as described in more detail elsewhere herein. For example, controller/processor 240 of BS 110, controller/processor 280 of UE 120, and/or any other component(s) of FIG. 2 may perform or direct operations of, for example, process 600 of FIG. 6 and/or other processes as described herein. Memories 242 and 282 may store data and program codes for BS 110 and UE 120, respectively. A scheduler 246 may schedule UEs for data transmission on the downlink and/or uplink.

In some aspects, UE 120 may include means for receiving a communication that includes DCI, wherein a size of the DCI affects a CRC value associated with the communication; means for determining the DCI or the size of the DCI based at least in part on the CRC value; and/or the like. In some aspects, such means may include one or more components of UE 120 described in connection with FIG. 2.

As indicated above, FIG. 2 is provided merely as an example. Other examples are possible and may differ from what was described with regard to FIG. 2.

Figure 3A:
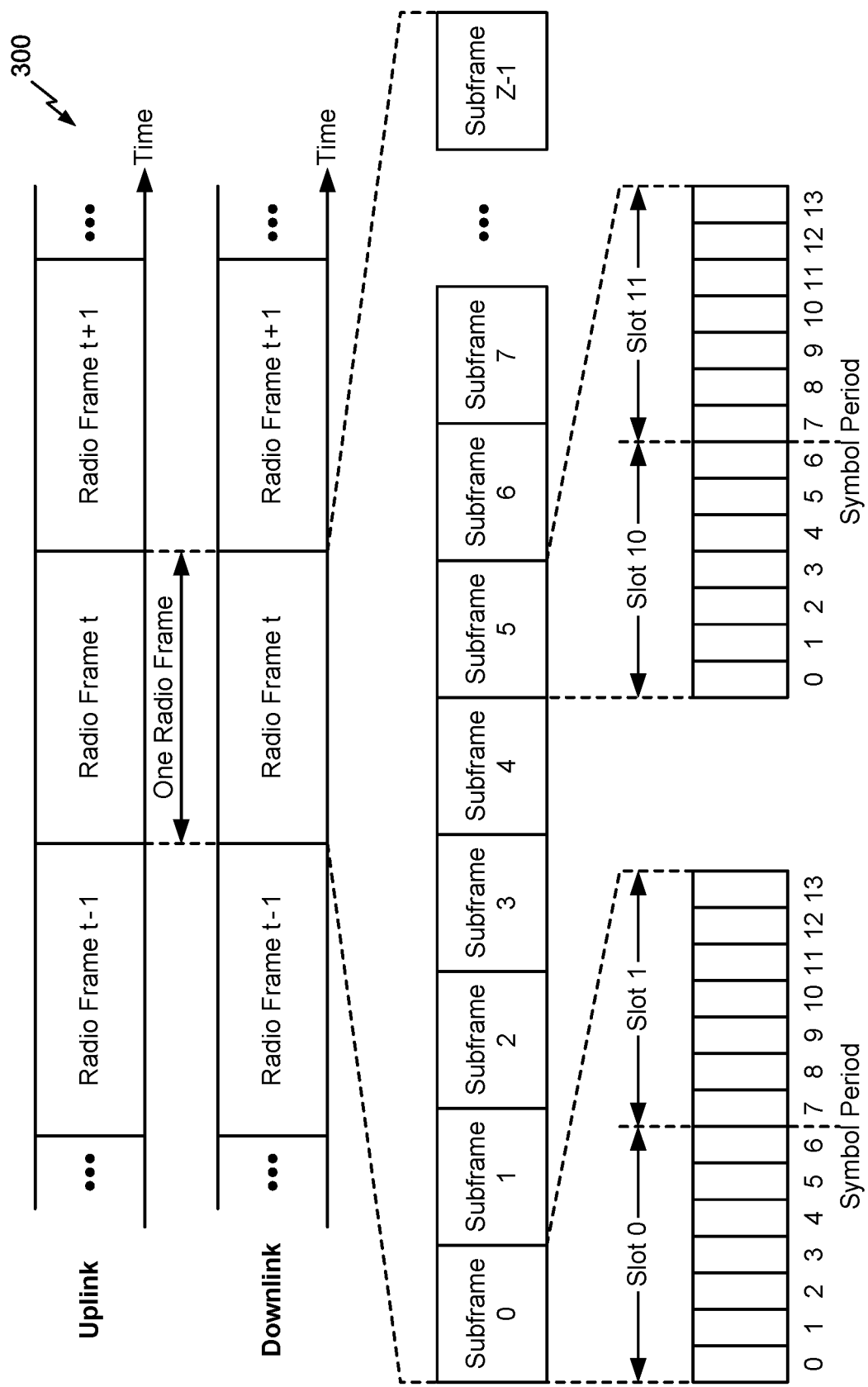
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
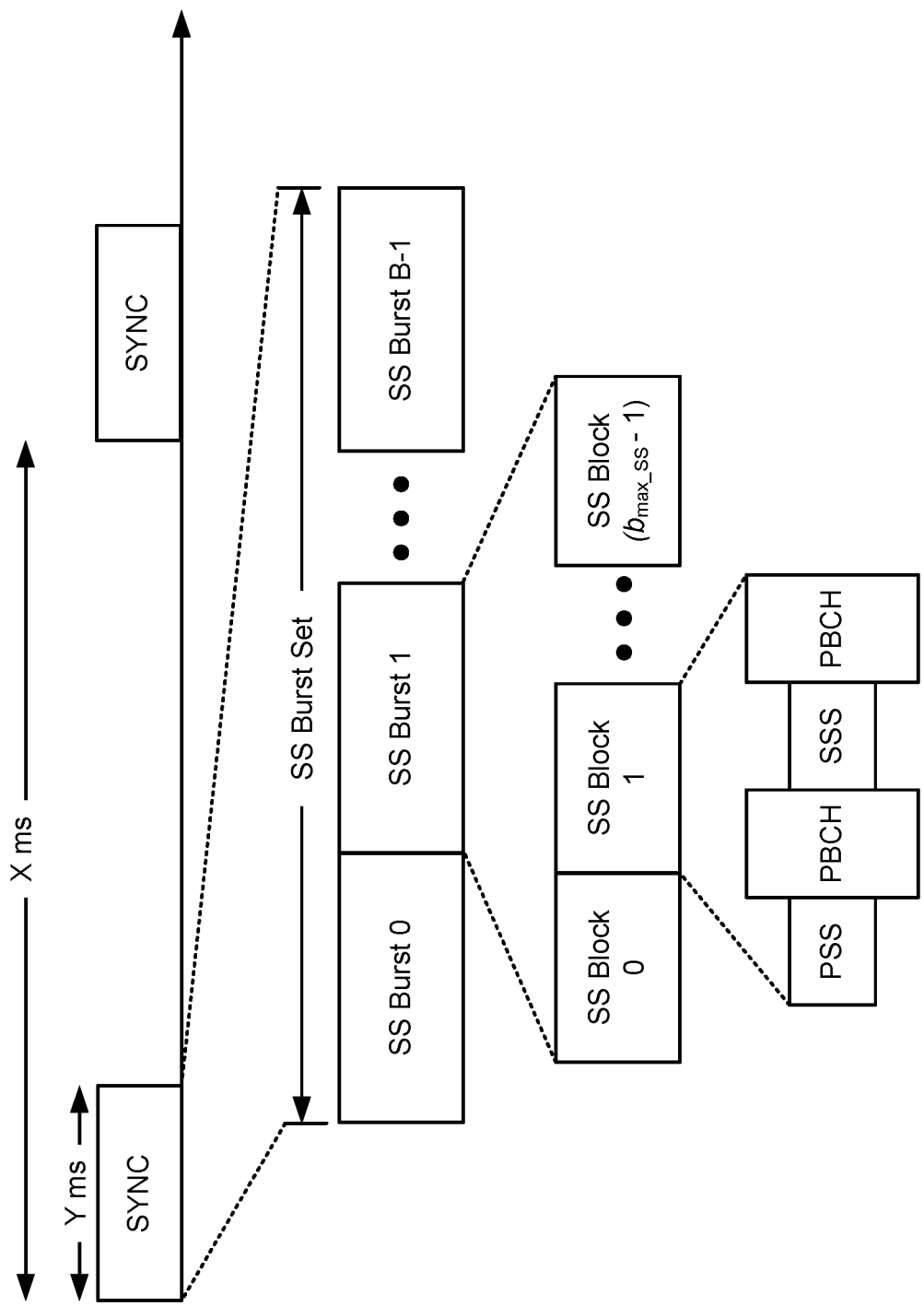
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
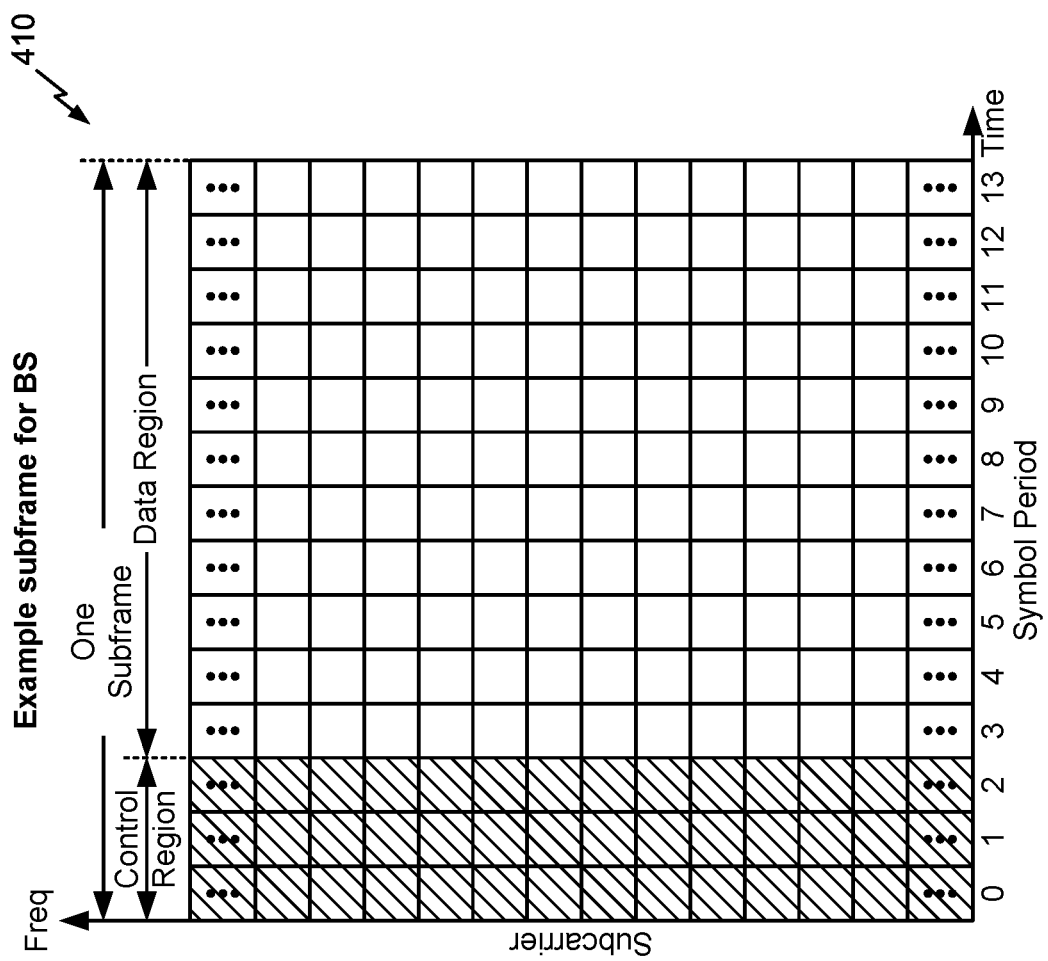
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

A scheduling entity (e.g., BS 110, UE 120, or another entity) may provide Layer 1 signaling, such as scheduling information, modulation information, and/or the like, to a UE (e.g., UE 120) using control information. While aspects described herein are described with the UE as a receiving device, aspects described herein are not limited to cases in which the UE is the receiving device, and may be applied with regard to any device as the receiver or receiving device. One example of control information is downlink control information (DCI), which may be transmitted by the scheduling entity in a physical downlink control channel (PDCCH) payload.

The UE may perform blind decoding of the PDCCH payload because the UE may not be aware of the exact control channel structure, such as the number of control channels and the number of control channel elements (CCEs) to which each control channel is mapped. Therefore, the UE may not know exactly which control channel carries an appropriate PDCCH for the UE. The UE may find the appropriate PDCCH by monitoring a set of PDCCH candidates (e.g., a set of consecutive CCEs on which a PDCCH could be mapped). The UE may use a Radio Network Temporary Identifier (RNTI) of the UE to attempt to decode cyclic redundancy checks (CRCs) of PDCCH candidates. If no CRC decoding error is detected, the UE determines that the corresponding PDCCH candidate carries control information for the UE.

Polar coding is a linear block error correcting code that may be used for some communications in 5G/NR. Polar coding includes two types of bits: information bits that carry a payload of a communication, and frozen bits that are always set to zero. For example, the frozen bits may correspond to low-reliability channels and the information bits may correspond to high-reliability channels. However, the frozen bits may complicate the blind decoding process. For example, if a leading information bit of a PDCCH payload is equal to zero, the leading information bit may be difficult to distinguish from a frozen bit that is always equal to zero. In such a case, CRC decoding will succeed for two hypotheses: one hypothesis that assumes a smaller DCI size and a frozen bit as a leading bit, and another hypothesis that assumes a larger DCI size and a zero-value information bit as the leading bit. This may cause confusion and DCI loss at the UE.

As an example of a situation wherein two different PDCCH payloads produce the same CRC value despite one of the PDCCH payloads being associated with one or more leading zeroes, consider the payloads 10100001 and 000010100001, wherein leftmost bits of the payloads are least significant bits. The CRC values may be generated using the 4-bit CRC polynomial: $x^4+x^3+x^2+x+1$. In such a case, when the CRC register is initialized using all zeroes, CRC values for both payloads may be equal to 0010, wherein the leftmost bits of the CRC values are the least significant bits. This may create problems in decoding since two different hypotheses for DCI size may be associated with the same CRC value, thus causing potential false positives when decoding of the CRC value is successful.

Aspects described herein provide for generation of a CRC value that is affected by a size of a DCI for which the CRC value is generated. For example, a CRC register for the generation of the CRC value may be initialized with a non-zero value, or the size of the DCI may be used when generating the CRC or a mask of the CRC. In this way, ambiguity of zero-value leading bits of DCI may be reduced, thereby improving a success rate of decoding DCI and improving throughput of the UE.

Figure 5:
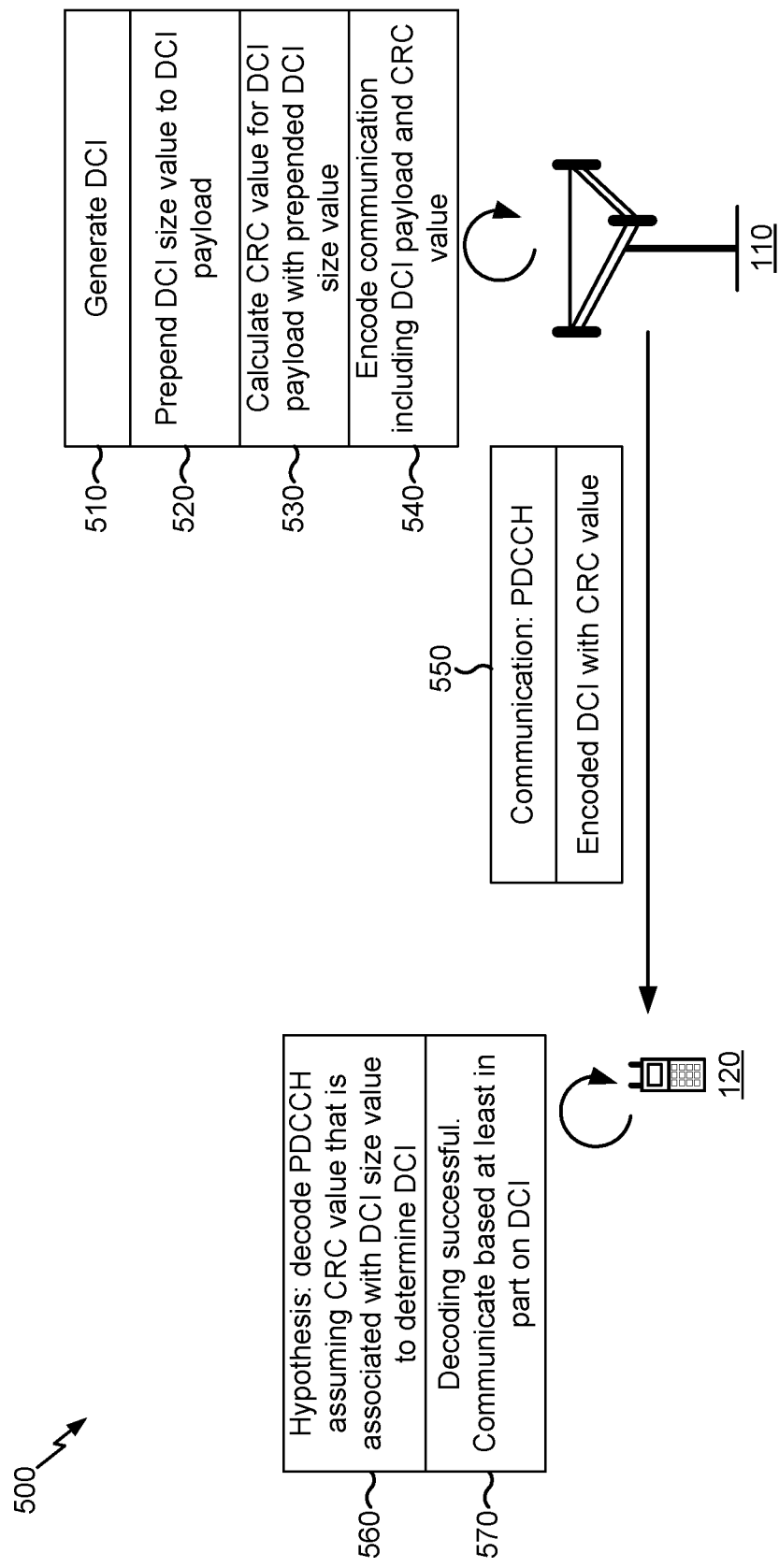
FIG. 5 is a diagram illustrating an example of control information determination for payloads with leading zeroes, in accordance with various aspects of the present disclosure.

FIG. 5 is a diagram illustrating an example 500 of control information determination for payloads with leading zeroes, in accordance with various aspects of the present disclosure.

As shown in FIG. 5, and by reference number 510, BS 110 may generate DCI. For example, the DCI may include scheduling information, configuration information, and/or other information. The BS 110 may generate the DCI for UE 120. For example, the DCI may include scheduling information, control information, configuration information, and/or other information pertaining to UE 120. In some aspects, the DCI may have a particular format, such as a DCI format associated with 5G/NR. In some aspects, the DCI may have a size. The size of the DCI may be based at least in part on a number of bits included in the DCI and/or the DCI format of the DCI. In some aspects, the size of the DCI may include one or more bits of a CRC value associated with the DCI (e.g., one bit, a set number of bits, all bits, or another value). In some aspects, the size of the DCI may not include the CRC value.

As shown by reference number 520, in some aspects, BS 110 may prepend a DCI size value to the DCI. For example, BS 110 may prepend the DCI size value to cause the size of the DCI to affect determination of a CRC value for the DCI. As a more particular example, if the DCI has a payload of 0482615, BS 110 may prepend a DCI size value of 7 to the payload of the DCI before determining the CRC value. In some aspects, BS 110 may append the DCI size value to the DCI. In this way, the CRC value may be different for two DCIs of different sizes, even when one of the two DCIs has one or more leading zero-value information bits that would otherwise cause the two DCIs to have identical CRC values.

In some aspects, BS 110 may prepend or append a value that is calculated based at least in part on the size of the DCI. In some aspects, BS 110 may prepend or append a particular value (e.g., 1, 0, etc.) one or more times. Additionally, or alternatively, BS 110 may prepend or append the value 1, repeated a number of times equal to the DCI size value. Additionally, or alternatively, BS 110 may prepend or append a value calculated as follows: (DCI size*Prime number) mod X, wherein X includes any integer value (e.g., 16, 24, 32, etc.). This may reduce a size of the prepended or appended value.

As shown by reference number 530, BS 110 may calculate a CRC value for the DCI payload with the prepended DCI size value. In some aspects, BS 110 may calculate the CRC value for the DCI payload based at least in part on an appended DCI size value, or based at least in part on a prepended or appended value calculated based at least in part on a DCI size value. In this way, BS 110 may determine a CRC value that is different for a DCI payload with a frozen-bit leading zero value than for a DCI payload with an information-bit leading zero value.

In some aspects, BS 110 may initialize a register for the CRC in a particular way so that the CRC value is affected by the size of the DCI. For example, BS 110 may initialize the register with a non-zero value to cause the CRC value to be affected by the size of the DCI. In some aspects, BS 110 may initialize the register with a single 1 value or a series of two or more 1 values. In some aspects, BS 110 may initialize the register with a RNTI of UE 120, which may aid in decoding the CRC value. In some aspects, BS 110 may initialize the register with a cell identifier or zone identifier pertaining to BS 110 and/or UE 120. In some aspects, BS 110 may initialize the register with the size of the DCI for which the CRC value is to be determined.

As another example of initializing the CRC so that the CRC value is affected by the size of the DCI, consider the following. The CRC of a string ([1 1 1 ... 1 1] [DCI]) may be equivalent to the CRC of a CRC mask ([1 1 1 ... 1 1] [0 ... 0]) XOR CRC ([DCI]) when [0 ... 0] is equal in size or length to the DCI. Thus, when initializing the CRC register using this CRC mask, the CRC value of the DCI may be affected by the size of the DCI.

As an example of how initializing the register with a non-zero value may cause the determined CRC value to be different for different sizes of DCI, consider the example described above, for the payloads 10100001 and 000010100001. As described above, the CRC values may be generated using the 4-bit CRC polynomial: $x^4+x^3+x^2+x+1$. When the register is initialized using all 1 values, the CRC value for the payload 10100001 may be 0000, and the CRC value for the payload 000010100001 may be 0011. In this way, the CRC value may be affected by the size of the DCI (e.g., the payloads), which enables successful decoding of DCI that may have one or more leading zeroes.

In some aspects, BS 110 may generate a CRC mask in a particular way so that the CRC value is affected by the size of the DCI. For example, BS 110 may generate the CRC mask based at least in part on the DCI size by performing an exclusive OR (e.g., XOR) operation of the CRC mask and the size of the DCI. Additionally, or alternatively, BS 110 may generate the CRC mask by performing an exclusive OR operation of the CRC mask and a value determined based at least in part on the DCI payload. Thus, the CRC mask may be affected by the size of the DCI, which reduces a likelihood of DCI failure for polar coding and/or DCI that may have one or more leading zeroes.

As shown by reference number 540, BS 110 may encode the communication including the DCI payload and the CRC value. For example, BS 110 may append the CRC value to the DCI payload, and may perform channel coding, rate matching, scrambling, mapping, layer mapping, pre-coding, re-mapping, transmission, and/or the like.

As shown by reference number 550, BS 110 may transmit the communication to UE 120 in a PDCCH. As further shown, the communication may include the encoded DCI and the CRC value. For example, the encoded DCI and the CRC value may be mapped to one or more CCEs of the PDCCH, and the one or more CCEs may not be known to UE 120. UE 120 may attempt to decode CRC values corresponding to sets of CCEs, using a RNTI associated with UE 120 and/or a size of the DCI, until the one or more CCEs are found based at least in part on decoding of the CRC value associated with the one or more CCEs being successful.

As shown by reference number 560, UE 120 may attempt to decode a PDCCH based at least in part on a hypothesis. For example, UE 120 may perform blind decoding to identify the PDCCH. To perform blind decoding, UE 120 may form a hypothesis for decoding a set of resources (e.g., a set of CCEs) which may have a CRC value corresponding to the DCI associated with UE 120, and may attempt to decode the CRC value using a RNTI associated with UE 120 and based at least in part on a size of the DCI associated with UE 120. When decoding is successful with regard to a particular PDCCH, UE 120 may determine that the particular PDCCH is relevant to UE 120 and may determine the DCI accordingly. UE 120 may attempt to decode the CRC value assuming that the CRC value is affected by the size of the DCI. In this way, ambiguity with regard to DCI having one or more leading zeroes may be reduced, which reduces likelihood of false positive decoding of CRC values when polar coding is used.

In some aspects, when the CRC mask is generated based at least in part on the size of the DCI, UE 120 may decode the CRC value according to the CRC mask. For example, UE 120 may determine the CRC mask based at least in part on a RNTI of UE 120, a size of the DCI, and/or a payload of the DCI. Thus, UE 120 may use a CRC mask that is generated based at least in part on the size of the DCI to decode the CRC value, which further reduces likelihood of false positive decoding of CRC values when polar coding is used.

As shown by reference number 570, UE 120 may determine that decoding is successful, and may thereby communicate based at least in part on the DCI. For example, UE 120 may determine the DCI based at least in part on decoding of the CRC value being successful, and may communicate according to the DCI (e.g., based at least in part on scheduling information, configuration information, and/or other information included in the DCI). In this way, UE 120 decodes a CRC value that is affected by a size of the DCI. This may reduce the likelihood of false positive decoding of CRC values in a situation where DCI may include one or more leading zeroes, thus reducing DCI loss for polar coded communications.

As indicated above, FIG. 5 is provided as an example. Other examples are possible and may differ from what was described with respect to FIG. 5.

Figure 6:
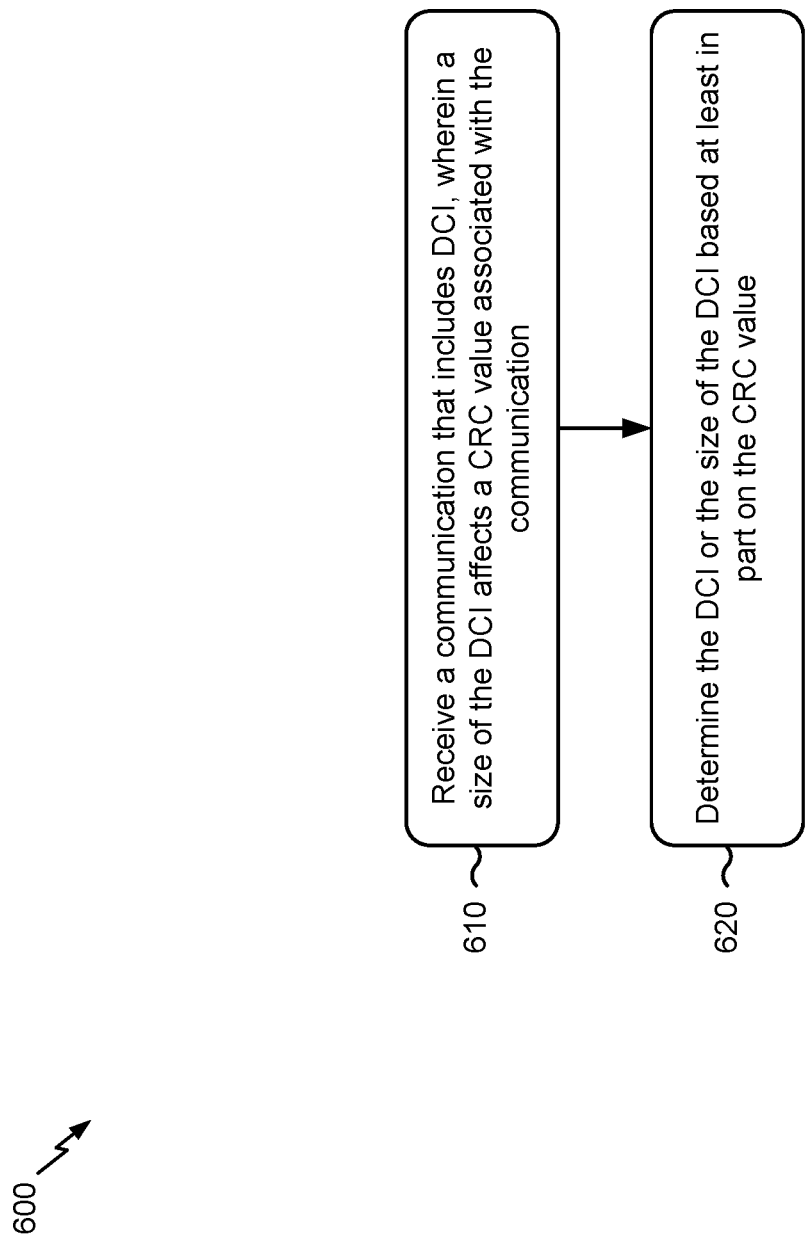
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120 or a receiver or receiving device) performs control information determination for payloads with leading zeroes.

As shown in FIG. 6, in some aspects, process 600 may include receiving a communication that includes DCI, wherein a size of the DCI affects a CRC value associated with the communication (block 610). For example, the UE (e.g., using antenna 252, DEMOD 254, MIMO detector 256, receive processor 258, controller/processor 280, and/or the like) may receive a communication. The communication may include DCI. For example, the communication may include one or more PDCCHs associated with respective DCIs. A size of the DCI may affect a CRC value associated with the communication, as described in more detail elsewhere herein.

As shown in FIG. 6, in some aspects, process 600 may include determining the DCI or the size of the DCI based at least in part on the CRC value (block 620). For example, the UE (e.g., using controller/processor 280 and/or the like) may determine at least one of the DCI or the size of the DCI. The UE may determine the DCI based at least in part on the CRC value. For example, the UE may use a hypothesis regarding the CRC value to attempt to decode the CRC value based at least in part on a RNTI of the UE and the size of the DCI. When decoding of the CRC value is successful, the UE may determine that the communication pertains to the UE, and may determine (e.g., decode) the DCI. The UE may communicate based at least in part on the DCI.

Process 600 may include additional aspects, such as any single aspect or any combination of aspects described below and/or in connection with one or more other processes described elsewhere herein.

In some aspects, the communication is encoded using polar coding. In some aspects, a register for the CRC is initialized using at least one non-zero value. In some aspects, a value that is based at least in part on the size of the DCI is prepended or appended to a payload of the DCI for calculation of the CRC value. In some aspects, a value is prepended or appended to a payload of the DCI for calculation of the CRC value. In some aspects, the value is based at least in part on the size of the DCI. In some aspects, a CRC mask for determining the CRC value is generated based at least in part on the size of the DCI. In some aspects, a CRC mask for determining the CRC value is generated based at least in part on a payload of the DCI. In some aspects, the size of the DCI includes at least one bit of the CRC value. In some aspects, the size of the DCI does not include the CRC value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   receiving a communication that includes downlink control information (DCI),
      wherein a size of the DCI affects a cyclic redundancy check (CRC) value associated with the communication, and
      wherein the size of the DCI is based on a payload, including any leading zeros of the payload of the DCI; and
   determining the DCI or the size of the DCI based at least in part on the CRC value.

2. The method of claim 1, wherein the communication is coded using polar coding.

3. The method of claim 1, wherein a register for the CRC is initialized using at least one non-zero value.

4. The method of claim 1, wherein a value is prepended or appended to a payload of the DCI for calculation of the CRC value.

5. The method of claim 4, wherein the value is based at least in part on the size of the DCI.

6. The method of claim 1, wherein a CRC mask for determining the CRC value is generated based at least in part on the size of the DCI.

7. The method of claim 1, wherein the size of the DCI includes at least one bit of the CRC value.

8. The method of claim 1, wherein the size of the DCI does not include the CRC value.

9. A user equipment (UE) for wireless communication, comprising:
   a memory; and
   one or more processors operatively coupled to the memory, the memory and the one or more processors configured to:
      receive a communication that includes downlink control information (DCI),
         wherein a size of the DCI affects a cyclic redundancy check (CRC) value associated with the communication, and
         wherein the size of the DCI is based on a payload, including any leading zeros of the payload of the DCI; and
      determine the DCI or the size of the DCI based at least in part on the CRC value.

10. The UE of claim 9, wherein the communication is encoded using polar coding.

11. The UE of claim 9, wherein a register for the CRC is initialized using at least one non-zero value.

12. The UE of claim 9, wherein a value is prepended or appended to a payload of the DCI for calculation of the CRC value.

13. The UE of claim 12, wherein the value is based at least in part on the size of the DCI.

14. The UE of claim 9, wherein a CRC mask for determining the CRC value is generated based at least in part on the size of the DCI.

15. The UE of claim 9, wherein the size of the DCI includes at least one bit of the CRC value.

16. The UE of claim 9, wherein the size of the DCI does not include the CRC value.

17. A non-transitory computer-readable medium storing one or more instructions for wireless communication, the one or more instructions comprising:
    one or more instructions that, when executed by one or more processors of a user equipment (UE), cause the one or more processors to:
        receive a communication that includes downlink control information (DCI),
            wherein a size of the DCI affects a cyclic redundancy check (CRC) value associated with the communication, and
            wherein the size of the DCI is based on a payload, including any leading zeros of the payload of the DCI; and
        determine the DCI or the size of the DCI based at least in part on the CRC value.

18. The non-transitory computer-readable medium of claim 17, wherein the communication is encoded using polar coding.

19. The non-transitory computer-readable medium of claim 17, wherein a register for the CRC is initialized using at least one non-zero value.

20. The non-transitory computer-readable medium of claim 17, wherein a value is prepended or appended to a payload of the DCI for calculation of the CRC value.

21. The non-transitory computer-readable medium of claim 20, wherein the value is based at least in part on the size of the DCI.

22. The non-transitory computer-readable medium of claim 17, wherein a CRC mask for determining the CRC value is generated based at least in part on the size of the DCI.

23. The non-transitory computer-readable medium of claim 17, wherein the size of the DCI includes at least one bit of the CRC value.

24. The non-transitory computer-readable medium of claim 17, wherein the size of the DCI does not include the CRC value.

25. An apparatus for wireless communication, comprising:
    means for receiving a communication that includes downlink control information (DCI),
        wherein a size of the DCI affects a cyclic redundancy check (CRC) value associated with the communication, and
        wherein the size of the DCI is based on a payload, including any leading zeros of the payload of the DCI; and
    means for determining the DCI or the size of the DCI based at least in part on the CRC value.

26. The apparatus of claim 25, wherein the communication is encoded using polar coding.

27. The apparatus of claim 25, wherein a register for the CRC is initialized using at least one non-zero value.

28. The apparatus of claim 25, wherein a value is prepended or appended to a payload of the DCI for calculation of the CRC value.

29. The apparatus of claim 28, wherein the value is based at least in part on the size of the DCI.

30. The apparatus of claim 25, wherein a CRC mask for determining the CRC value is generated based at least in part on the size of the DCI.

* * * * *